US012417642B2

(12) United States Patent
Mori

(10) Patent No.: US 12,417,642 B2
(45) Date of Patent: Sep. 16, 2025

(54) SYSTEM TO INTEGRATE HIGH DISTORTION WIDE-ANGLE CAMERA RECOGNITION WITH LOW DISTORTION NORMAL-ANGLE CAMERA RECOGNITION

(71) Applicant: CANON KABUSHIKI KAISHA, Tokyo (JP)

(72) Inventor: Makiko Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 488 days.

(21) Appl. No.: 17/946,134

(22) Filed: Sep. 16, 2022

(65) Prior Publication Data

US 2023/0113406 A1 Apr. 13, 2023

(30) Foreign Application Priority Data

Sep. 24, 2021 (JP) .................. 2021-155814

(51) Int. Cl.
*G06K 9/00* (2022.01)
*B60W 30/00* (2006.01)
(Continued)

(52) U.S. Cl.
CPC ............. *G06V 20/58* (2022.01); *B60W 30/00* (2013.01); *G06T 5/80* (2024.01); *B60W 2420/403* (2013.01)

(58) Field of Classification Search
CPC ........... G06T 7/00; H04N 7/18; H04N 23/698
See application file for complete search history.

(56) References Cited

U.S. PATENT DOCUMENTS 8,792,039 B2 7/2014 Hirooka
9,740,942 B2 8/2017 Yamaguchi
(Continued)

FOREIGN PATENT DOCUMENTS

EP 2381673 A1 10/2011
JP 2004-345554 A 12/2004
(Continued)

OTHER PUBLICATIONS

T. Hui Teo, et al., "Fast Object Detection on the Road", 2020 IEEE Asia Pacific Conference on Circuits and Systems (APCCAS), XP093137818, Retrieved from the Internet: URL:https://ieeexplore.ieee.org/stampPDF/getPDF.jsp?tp=&arnumber=9301706&ref=, Dec. 8, 2020, pp. 173-176.
Mar. 13, 2024 European Official Action in European Patent Appln. No. 22193594.3.
Feb. 22, 2023 European Official Action in European Patent Appln. No. 22193594.3.

(Continued)

*Primary Examiner* — Gregory A Morse
*Assistant Examiner* — Owais Iqbal Memon
(74) *Attorney, Agent, or Firm* — Venable LLP

(57) ABSTRACT

An image processing system includes: an image acquisition unit configured to acquire image data generated by an imaging device that captures an optical image having a low-distortion region and a high-distortion region; a first image recognition unit configured to perform image recognition on image data of at least a partial region in the image data acquired by the image acquisition unit to output a first image recognition result; a second image recognition unit configured to perform image recognition on image data of a region wider than the partial region in the image data acquired by the image acquisition unit to output a second image recognition result; and an integration processing unit configured to output an image recognition result integrated on the basis of the first image recognition result and the second image recognition result.

3 Claims, 11 Drawing Sheets

(51) Int. Cl.
*G06T 5/80* (2024.01)
*G06V 20/58* (2022.01)

(56) References Cited

U.S. PATENT DOCUMENTS

| | | |
|---|---|---|
| 9,811,742 B2 | 11/2017 | Ogata |
| 11,461,595 B2 | 10/2022 | Akiyama |
| 2011/0249153 A1 | 10/2011 | Hirooka |
| 2015/0332100 A1 | 11/2015 | Yamaguchi |
| 2016/0364619 A1* | 12/2016 | Ogata .................. G06T 7/50 |
| 2019/0266423 A1* | 8/2019 | Akiba .................. G06T 7/74 |
| 2019/0370609 A1 | 12/2019 | Akiyama |
| 2021/0188167 A1* | 6/2021 | Fürsich .................. B60R 1/26 |

FOREIGN PATENT DOCUMENTS

| | | |
|---|---|---|
| JP | 2010-095202 A | 4/2010 |
| JP | 2015-132879 A | 7/2015 |
| JP | 2017-084006 A | 5/2017 |
| JP | 2018-097766 A | 6/2018 |
| WO | 2014/091877 A1 | 6/2014 |
| WO | 2020/066068 A1 | 4/2020 |

OTHER PUBLICATIONS

Aug. 1, 2023 Japanese Official Action in Japanese Patent Appln. No. 2021-155814.

\* cited by examiner

SYSTEM TO INTEGRATE HIGH DISTORTION WIDE-ANGLE CAMERA RECOGNITION WITH LOW DISTORTION NORMAL-ANGLE CAMERA RECOGNITION

BACKGROUND OF THE INVENTION

Field of the Invention

The present invention relates to an image processing system, a mobile object, an image processing method, and a storage medium for performing image recognition.

Description of the Related Art

In recent years, there has been a demand for replacing a rear-view mirror (back view mirror) mounted in a vehicle with an electronic rear view mirror. Japanese Patent Laid-Open No. 2010-95202 discloses an electronic rear view mirror system that includes an imaging unit adapted to image a rear side outside a vehicle as an imaging range and a display unit disposed inside the vehicle and enables a driver to check rear conditions outside the vehicle through display of an image captured by the imaging unit on a display inside the vehicle.

On the other hand, there is a rear side checking system that enables a driver to check a blind angle behind a vehicle when the vehicle moves backward or the like. Japanese Patent Laid-Open No. 2004-345554 discloses a rear side checking system that includes a camera placed to image a side behind a vehicle and is for enabling a driver to check a blind angle behind the vehicle at the time of backward moving through display of a captured image inside a vehicle interior.

The imaging unit adapted to capture an image for the electronic rear view mirror as described above is required to have high resolution for allowing the driver to check rear conditions that are relatively far from the driver with more accuracy. On the other hand, the camera for the rear side checking system is required to image a wider range in order to check safety in a wider range including blind angles and rear lateral sides behind the vehicle to avoid collision at the time of backward moving.

Therefore, if the electronic rear view mirror system and the rear side checking system are mounted in a vehicle at the same time, and the camera for the electronic rear view mirror system and the camera for the rear side checking system are individually mounted, an in-vehicle image processing system becomes complicated. Such a problem similarly occurs in an automated driving system that performs automated driving and the like by disposing a plurality of cameras to image conditions in the surroundings of a vehicle.

Although it is possible to reduce the number of cameras to be placed in a vehicle by adopting cameras using super-wide-angle lenses such as fisheye lenses to address this problem, it is still difficult to obtain images with a high resolution while it is possible to obtain a wide angle of view. If image recognition is performed in the system using fisheye lenses, and the image recognition is carried out without any distortion correction, there is a likelihood that recognition accuracy in a periphery portion of the image may be degraded.

On the other hand, if the image recognition is carried out after distortion correction, there is a likelihood that a processing load may become large and it may take a long time depending on an image size or resolution.

Moreover, if the distortion correction is performed on a plurality of images captured by a plurality of cameras, there is a problem that the processing load may become yet larger.

SUMMARY OF THE INVENTION

An image processing system according to an aspect of the present invention comprises at least one processor or circuit configured to function as:
an image acquisition unit configured to acquire image data generated by an imaging device that captures an optical image including a low-distortion region and a high-distortion region;
a first image recognition unit configured to perform image recognition on image data of at least a partial region in the image data acquired by the image acquisition unit to output a first image recognition result;
a second image recognition unit configured to perform image recognition on image data of a region wider than the partial region in the image data acquired by the image acquisition unit to output a second image recognition result; and an integration processing unit configured to output an image recognition result integrated on the basis of the first image recognition result and the second image recognition result.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

In a first embodiment, an improved method for balancing, with a small number of cameras, high-definition display for an electronic rear view mirror and wide-range display for checking surroundings of a vehicle such as a rear side will be described.

Figure 1:
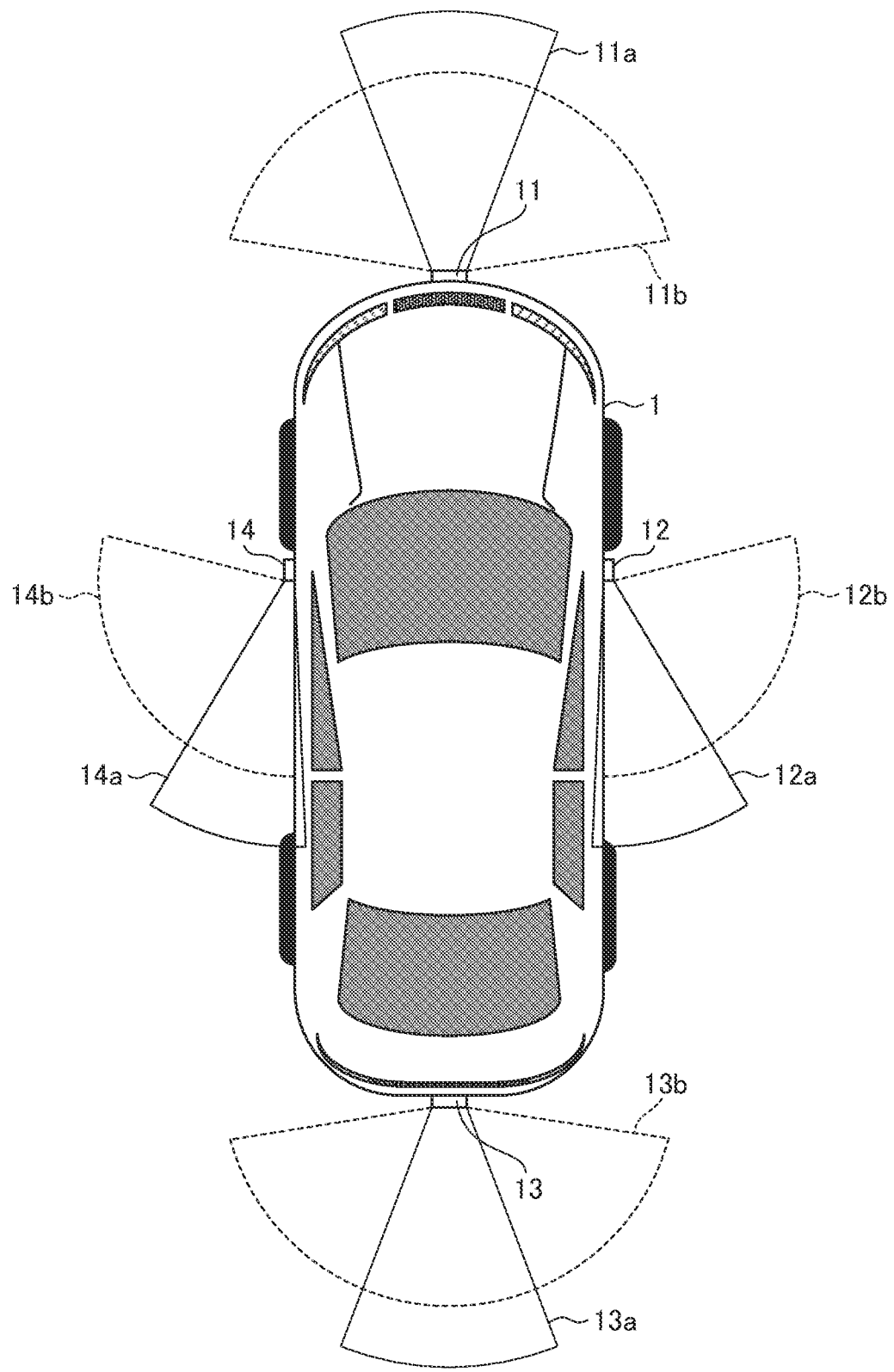
FIG. 1 is a diagram for explaining positional relationships between a vehicle 1 and camera units 11 to 14 according to a first embodiment.

FIG. 1 is a diagram for explaining a positional relationship between a vehicle 1 (an automobile, for example) and camera units 11 to 14 in the first embodiment. The vehicle 1 operates as a mobile object, and all the camera units 11 to 14 operate as imaging devices.

In the first embodiment, the camera units 11, 12, 13, and 14 are installed on the front side, the right side, the rear side, and the left side of the vehicle 1 that is a mobile object, respectively, as illustrated in FIG. 1. Note that although the image processing system includes the four camera units in the first embodiment, the number of camera units that the image processing system has is not limited to four. The image processing system may be any image processing system including one or more camera units.

The camera units 11 to 14 are installed to image the side in front, the right side, the left side, and the rear side of the vehicle 1 that is a mobile object, as imaging ranges, respectively. Each of the camera units 11 to 14 has substantially similar components. For example, each of the camera units 11 to 14 includes an imaging device that captures an optical image and an optical system that generates an optical image on a light receiving surface of the imaging device. For example, the optical system that each of the camera units 11 to 14 has is installed such that an optical axis thereof is substantially horizontal.

The optical systems that each of the camera units 11 to 14 has are configured to be able to obtain a high-definition image at a narrow angle of view in the surroundings of the optical axis and obtain a captured image with a low resolution at a wide angle of view. Note that in FIGS. 1, 11a to 14a illustrate imaging angles of view at which high-resolution images can be captured while 11b to 14b illustrate imaging angles of view at which low-resolution images can be captured.

Next, optical properties of the optical systems that the camera units 11 to 14 have will be described with reference to FIG. 2A and FIG. 2B. Although the optical properties of the optical systems that the camera units 11 to 14 have may not be the same, it is assumed that the optical properties of the optical systems that the camera units 11 to 14 have are substantially the same in the first embodiment. Therefore, optical properties of the optical system that the camera unit 11 has will be described as examples in FIG. 2A and FIG. 2B.

FIG. 2A is a diagram illustrating, as a contour line, an image height y at each half angle of view on the light receiving surface of the imaging device of the optical system that the camera unit 11 has. FIG. 2B is a diagram representing projection properties representing a relationship between the image height y of the optical system that the camera unit 11 has and a half angle of view θ. FIG. 2B is illustrated with the half angle of view (an angle formed by an optical axis and an incident light beam) θ shown as the horizontal axis and with the image formation height (image height) y on the sensor plane (on the image plane) of the camera unit 11 defined by the vertical axis.

The optical system that the camera unit 11 has is configured such that the projection properties y(θ) differ in a region of less than a predetermined half angle of view θa and in a region of equal to or greater than the half angle of view θa as illustrated in FIG. 2B. Therefore, resolutions differ depending on regions when the amount of increase in image height y with respect to the half angle of view θ per unit is defined as a resolution.

It is also possible to state that the local resolution is represented by a differential value $dy(θ)/dθ$ at the half angle of view θ of the projection property y(θ). In other words, it is possible to state that the larger the inclination of the projection property y(θ) in FIG. 2B is, the higher the resolution is. Also, it is possible to state that the larger the interval of the image height y at each half angle of view as a contour in FIG. 2A is, the higher the resolution is.

In the first embodiment, a region near the center that is generated on the sensor plane when the half angle of view θ is less than the predetermined half angle of view θa is referred to as a high-resolution region 10a, and a region near the outside where the half angle of view θ is equal to or greater than the predetermined half angle of view θa is referred to as a low-resolution region 10b. Note that the angle of view in the high-resolution region 10a corresponds to the imaging angle of view 11a, while the angle of view in the low-resolution region 10b corresponds to the imaging angle of view 11b.

Note that in the first embodiment, the high-resolution region 10a is a low-distortion region where the amount of distortion is relatively small, while the low-resolution region 10b is a high-distortion region where the amount of distortion is relatively large. Therefore, the high-resolution region and the low-resolution region may be referred to as a low-distortion region and the high-distortion region, respectively, in the first embodiment.

The optical system that the camera unit 11 has is configured such that the projection property y(θ) in the high-resolution region (low-distortion region) 10a is greater than f×θ (f is a focal distance of the optical system that the camera unit 11 has). Also, the projection property y(θ) in the high-resolution region (low-distortion region) is set to be different from the projection property in the low-resolution region (high-distortion region).

When θmax is defined as a maximum half angle of view that the optical system of the camera unit 11 has, it is desirable that a ratio θa/θmax between θa and θmax be equal to or greater than a predetermined lower limit value, and for example, it is desirable that the predetermined lower limit value be 0.15 to 0.16.

Also, it is desirable that the ratio θa/θmax between θa and θmax be equal to or less than a predetermined upper limit value and be 0.25 to 0.35, for example. If θa is set to 90°, the predetermined lower limit value is set to 0.15, and the predetermined upper limit value is set to 0.35, for example, it is desirable to determine θa within a range of 13.5 to 31.5°.

Moreover, the optical system that the camera unit 11 has is configured such that the projection property y(θ) thereof satisfies the following expression as well:

$$1 < \frac{f \times \sin θ_{max}}{y(θ_{max})} \leq A$$

Here, f is a focal distance of the optical system that the camera unit 11 has as described above, and A is a predetermined constant. It is possible to obtain a higher center resolution than that of a fisheye lens based on an orthographic projection scheme (y=f×sinθ) having the same maximum image formation height by setting the lower limit value to one, and it is possible to maintain satisfactory optical performance while obtaining an angle of view equivalent to that of the fisheye lens by setting the upper limit value to A. It is only necessary to determine the predetermined constant A in consideration of a balance between resolutions in the high-resolution region and the low-resolution region, and it is desirable that the predetermined constant A be 1.4 to 1.9.

It is possible to obtain a high resolution in the high-resolution region 10a and to reduce the amount of increase in image height y with respect to the half angle of view θ per unit and to image a wider angle of view in the low-resolution region 10b by configuring the optical system as described above. Therefore, it is possible to obtain a high resolution in the high-resolution region 10a while setting the wide angle of view that is equivalent to that of the fisheye lens as an imaging range.

In the first embodiment, properties that are close to those of the center projection method (y=f×tanθ) and the equidistant projection method (y=f×θ) that are projection properties of an optical system for normal imaging are set in the high-resolution region (low-distortion region), and it is thus possible to obtain low optical distortion and thus high-definition display. Therefore, it is possible to obtain a natural perspective when surrounding vehicles such as a vehicle ahead and a following vehicle and the like are visually recognized and to obtain satisfactory visibility while curbing degradation of image quality.

Note that since it is possible to obtain similar effects by any projection property y(θ) as long as it satisfies the aforementioned condition of Expression 1, the first embodiment is not limited to the projection properties illustrated in FIGS. 2A and 2B. Note that in the first embodiment, the optical system having the projection property y(θ) that satisfies the aforementioned condition of Expression 1 may be referred to as a different-angle-of-view lens.

Note that the angles of view of the high-resolution regions 10a of the optical systems that the camera units 11 to 14 have correspond to imaging angles of view 11a to 14a, respectively, and the angles of view of the low-resolution regions 10b of the optical systems that the camera units 11 to 14 have correspond to imaging angles of view 11b to 14b, respectively.

Figure 3:
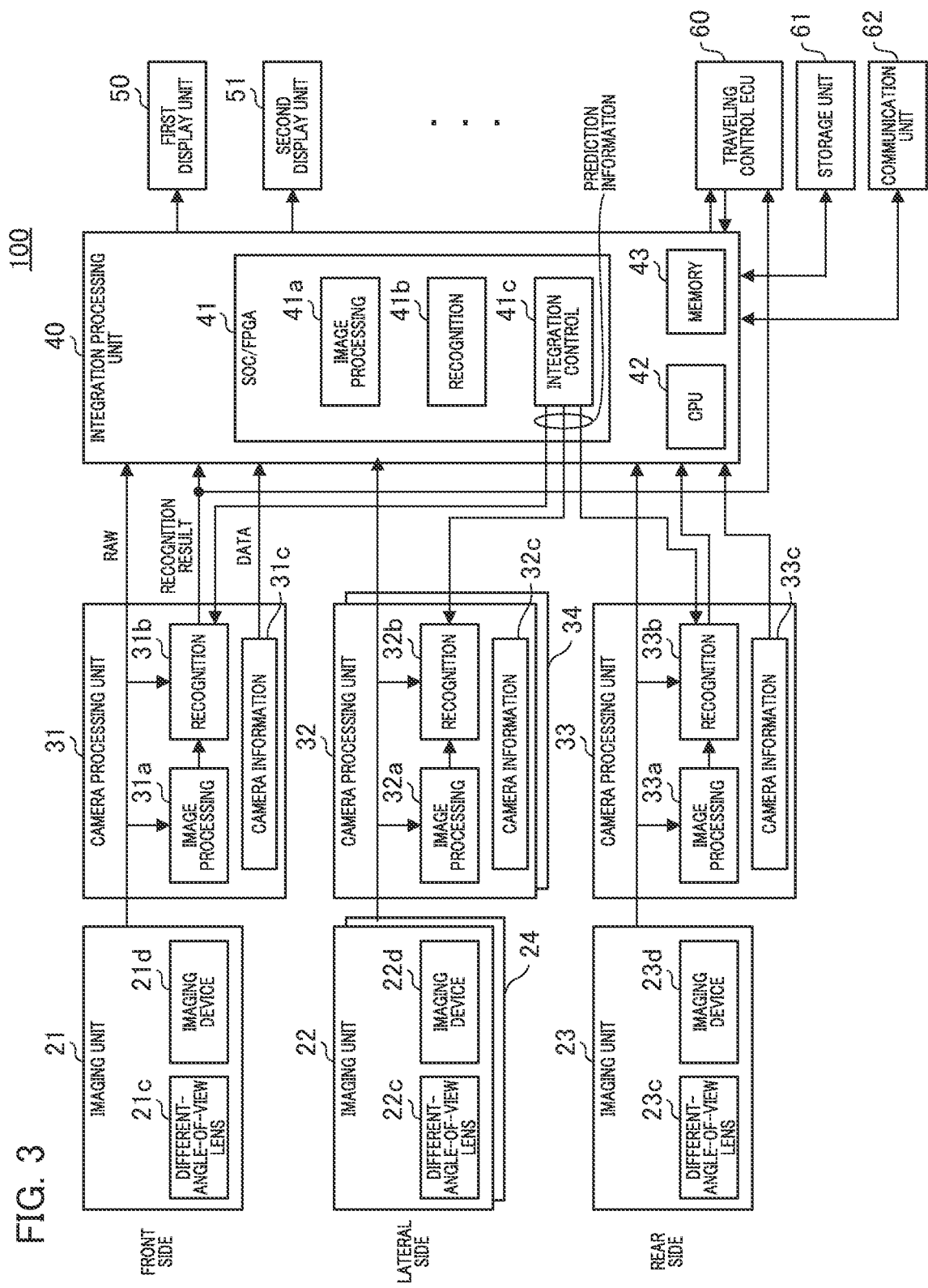
FIG. 3 is a block diagram for explaining a configuration of an image processing system 100 according to the first embodiment.

Next, a configuration of the image processing system 100 in the first embodiment will be described with reference to FIG. 3. FIG. 3 is a block diagram for explaining the configuration of the image processing system 100 in the first embodiment.

In FIG. 3, the image processing system 100 is mounted in the vehicle 1. Each of the camera units 11 to 14 includes a respective one of imaging units 21 to 24 and a respective one of camera processing units 31 to 34. Each of the imaging units 21 to 24 includes a respective one of different-angle-of-view lenses 21c to 24c and a respective one of imaging devices 21d to 24d.

The imaging devices 21d to 24d include, for example, CMOS image sensors or CCD image sensors. Here, each of the imaging units 21 to 24 functions as an image acquisition unit and acquires image data from a respective one of the imaging devices 21d to 24d that capture optical images including a low-distortion region and a high-distortion region.

Each of the different-angle-of-view lenses 21c to 24c that are optical systems is configured of one or more optical lenses, has the projection property y(θ) that satisfies the aforementioned condition of Expression 1, and generates an optical image including a low-distortion region and a high-distortion region on a light receiving surface of a respective one of the imaging devices 21d to 24d. Each of the imaging devices 21d to 24d performs photoelectrical conversion on the optical image and outputs imaging data.

RGB color filters, for example, are aligned for each pixel on each of the light receiving surfaces of the imaging devices 21d to 24d. The RGB alignment is, for example, Bayer alignment. Therefore, each of the imaging devices 21d to 24d is configured such that R, G, R, G pixel data is successively output from a predetermined row and G, B, G, B pixel data is successively output from the next row, for example, in accordance with the Bayer alignment.

Each of the camera processing units 31 to 34 is accommodated along with a respective one of the imaging units 21 to 24 in a casing of a respective one of the camera units 11 to 14. Each of the camera processing units 31 to 34 processes the imaging data output from a respective one of the imaging units 21 to 24.

Each of the camera processing units 31 to 34 includes a respective one of image processing units 31a to 34a, a respective one of recognition units 31b to 34b, and a respective one of camera information units 31c to 34c. The image processing units 31a to 34a perform image processing on imaging data output from the imaging units 21 to 24, respectively. Note that a part or entirety of the camera processing unit 31 may be implemented by a laminated signal processing unit inside the imaging devices 21d to 24d.

For example, each of the image processing units 31a to 34a performs De-Bayer processing on image data input from a respective one of the imaging units 21 to 24 in accordance with the Bayer alignment and converts the image data into image data based on an RGB luster format. Moreover, each of the image processing units 31a to 34a may perform white balance adjustment, gain/offset adjustment, gamma processing, color matrix processing, lossless compression processing, and the like.

Each of the recognition units 31b to 34b performs image recognition on a predetermined object (for example, an automobile, a person, an obstacle, or the like) from image data before distortion correction after image processing performed by a respective one of the image processing units 31a to 34a. For example, each of the recognition units 31b to 34b performs image recognition on image data corresponding to a low-distortion region in a state of image data before distortion correction without performing distortion correction thereon and outputs a first image recognition result.

Note that each of the recognition units 31b to 34b performs image recognition processing on image data before distortion correction obtained at least from the high-resolution region 10a and recognizes the predetermined target. Therefore, the image recognition processing may be performed after only the high-resolution region 10a is extracted.

In such a case, each of the recognition units 31b to 34b may also perform image recognition processing on image data before distortion correction obtained from the low-resolution region 10b. However, since distortion correction has not been performed on the image data before distortion correction, the image at the periphery portion of the different-angle-of-view lens has large distortion, and reliability of the recognition is degraded.

Note that each of the recognition units 31*b* to 34*b* may extract the image data before distortion correction obtained from the high-resolution region 10*a* and perform the image recognition processing only on the image data before distortion correction obtained from the high-resolution region 10*a*. In such a case, it is desirable that the extracted region have a rectangular shape for the image recognition processing.

If the extracted region has a rectangular shape, the extracted region may be only a part inside the high-resolution region 10*a* (for example, a rectangular shape that is inscribed in the high-resolution region 10*a*) or may be a rectangle including both the high-resolution region 10*a* and the low-resolution region 10*b*.

Here, the recognition units 31*b* to 34*b* function as first image recognition units that perform image recognition in image data in at least partial regions out of image data acquired by the image acquisition units and output first image recognition results. Note that in the first embodiment, the partial regions are regions corresponding to low-distortion regions.

Each of the recognition units 31*b* to 34*b* transmits a set of a type and coordinates of an object as a recognition result to an integration processing unit 40. On the other hand, each of the recognition units 31*b* to 34*b* receives prediction information that is a set of the type of the object and information regarding a moving direction of the object or priority recognition region information from an integration control unit 41*c* of the integration processing unit 40. The prediction information will be described later.

In the first embodiment, an output of the recognition unit 31*b* of the camera unit 11 installed on the front side is also supplied directly to a traveling control unit (ECU) 60. This is because there may be a case in which it is necessary to immediately stop traveling on the basis of a result of recognizing an obstacle or the like obtained by the recognition unit 31*b* or it is necessary to control traveling to avoid an obstacle.

Each of the camera information units 31*c* to 34*c* holds camera information of a respective one of the camera units 11 to 14 in a memory (such as a ROM) in advance. Each piece of camera information includes optical properties of a respective one of the different-angle-of-view lenses 21*c* to 24*c*, the number of pixels, gamma properties, sensitivity properties, a frame rate, and attachment coordinates and posture information in vehicle coordinates of the camera units of a respective one of the imaging devices 21*d* to 24*d*.

Moreover, each piece of camera information may include information regarding an image processing method and an image format when image data before distortion correction is generated by a respective one of the image processing units 31*a* to 34*a*. Note that the attachment coordinates and the posture coordinates are relative coordinates with respect to the vehicle 1. Also, each piece of camera information is information unique to a respective one of the imaging units 21 to 24 and is different from each other, and the information is transmitted to the integration processing unit 40 and is referred to when the integration processing unit 40 performs image processing.

Note that a CPU that serves as a computer and a memory that serves as a storage medium and stores a computer program are incorporated inside each of the camera processing units 31 to 34. Also, each CPU is configured to control each component included in each of the camera processing units 31 to 34 by executing the computer program in the memory.

Note that in the first embodiment, the image processing units 31*a* to 34*a* and the recognition units 31*b* to 34*b* use, for example, hardware such as dedicated circuits (ASICs) or processors (reconfigurable processors, DSPs, graphics processing units (GPUs)), for example. It is thus possible to realize an increase in speed for image recognition in the high-resolution region and to increase the likelihood that accidents can be avoided.

The integration processing unit 40 includes a system on chip (SOC)/field programmable gate array (FPGA) 41, a CPU 42 that serves as a computer, and a memory 43 that serves as a storage medium.

The CPU 42 performs various kinds of control on the entire image processing system 100 by executing the computer program stored in the memory 43. Note that in the first embodiment, the integration processing unit 40 is accommodated in a casing that is separated from those for the camera units.

The SOC/FPGA 41 includes an image processing unit 41*a*, a recognition unit 41*b*, and an integration control unit 41*c*. The image processing unit 41*a* acquires image data before distortion correction from each of the camera processing units 31 to 34 and acquires camera information of each of the camera units 11 to 14 from each of the camera information units 31*c* to 34*c*.

Each piece of camera information includes optical properties of the different-angle-of-view lenses 21*c* to 24*c*, the numbers of pixels, the photoelectric conversion properties, y properties, sensitivity properties, format information of image data before distortion correction of the imaging devices 21*d* to 24*d* as described above. Also, each piece of camera information includes the attachment coordinates and the posture information in the vehicle coordinates of the camera units.

The image processing unit 41*a* performs distortion correction in the image data obtained from the low-resolution region 10*b* of each of the imaging units 21 to 24. In the first embodiment, the image processing unit 41*a* does not perform distortion correction since the image data obtained from the high-resolution region 10*a* includes substantially no distortion.

However, the image processing unit 41*a* may also perform simplified distortion correction on the image data obtained from the high-resolution region 10*a*. The image processing unit 41*a* synthesizes the image data in the low-resolution region 10*b* with the image data in the high-resolution region 10*a* of each of the imaging units 21 to 24 after the distortion correction such that they are smoothly connected, and thereby generates an overall image for each of the imaging units 21 to 24.

Note that if distortion correction is performed on both the image data in the low-resolution region 10*b* and the image data obtained from the high-resolution region 10*a*, the image data before the distortion correction obtained from each of the image processing units 31*a* to 34*a* may be directly subjected to the distortion correction.

The recognition unit 41*b* performs image recognition processing on the overall image (including the peripheral portions of the image) for each of the imaging units 21 to 24 after performing the distortion correction on at least the low-resolution region and performs image recognition for a predetermined object (for example, an automobile, a person, or an obstacle) in the overall image for each of the imaging units 21 to 24. For example, the recognition unit 41*b* performs the distortion correction at least on the image data corresponding to the low-resolution region (high-distortion region), then performs image recognition thereon, and outputs a second image recognition result.

Note that the recognition unit 41b may refer to recognition results (the type and the coordinates of the target) of the recognition units 31b to 34b if image recognition processing is to be performed on the overall image (including the peripheral portions of the image). Here, the recognition unit 41b functions as a second image recognition unit that performs image recognition on image data in a wider region than the partial region on which the image recognition has been performed by the first image recognition unit, out of the image data acquired by the image acquisition unit and outputs a second image recognition result.

The second image recognition unit performs image recognition on both the image data corresponding to the high-resolution region 10a that is the low-distortion region and the low-resolution region 10b that is the high-distortion region and outputs the second image recognition result.

The image processing unit 41a may synthesize images of the plurality of imaging units such that they are connected to each other and generate a panoramic synthesized image. In such a case, it is desirable that at least a part of the imaging angle of view of each of the images of the plurality of imaging units that are connected to each other be set to have a mutually overlapping region of an amount that is equal to or greater than a predetermined amount.

The recognition unit 41b may perform image recognition on the panoramic synthesized image. In this manner, it is possible to perform image recognition of an object that is imaged across angles of view of the plurality of imaging units, for example. This is because there may be a case in which substantially the entire object appears in the panoramic synthesized image and it is possible to perform image recognition in the image processing although there is a case in which it is not possible to know the overall picture of the object from the individual entire images from the imaging units.

The integration control unit 41c outputs an integrated image recognition result by adopting a recognition result with higher reliability if the recognition results of the recognition units 31b to 34b are different from the recognition result of the recognition unit 41b, for example.

For example, proportions of the object occupying the images recognized by the recognition units 31b to 34b may be compared with the proportion of the same object occupying the image recognized by the recognition unit 41b, and the recognition result with a higher proportion may be determined and adopted as having higher reliability.

Alternatively, in a case of an object which lies across both the high-resolution region and the low-resolution region, a recognition result of the recognition unit 41b may be determined and adopted as having higher reliability rather than the recognition results of the recognition units 31b to 34b.

Alternatively, if the position of the object recognized by the recognition units 31b to 34b is at a peripheral part of the image, it may be determined that reliability is low, and the recognition result of the recognition unit 41b may be determined and adopted as having higher reliability.

Alternatively, the recognition unit 41b may perform image recognition only on the low-resolution region in a state in which distortion correction has been performed on the low-resolution region, and if there is an object which lies across the low-resolution region and the high-resolution region, image recognition may be performed on the target. For example, control may be performed such that the recognition unit 41b does not perform image recognition processing on the assumption that reliability of the recognition performed by the recognition units 31b to 34b is higher for the object that is present only in the high-resolution region.

Here, the integration control unit 41c functions as an integration processing unit that outputs an image recognition result integrated on the basis of the reliability of the first image recognition result and the reliability of the second image recognition result.

The integration control unit 41c generates image data for displaying a desired image out of the entire image of each of the imaging units 21 to 24, the panoramic synthesized image, and the like on a first display unit 50, a second display unit 51, and the like. Also, the integration control unit 41c generates a frame for displaying the recognized object in an emphasized manner, CG for information, alerts, and the like regarding the type, the size, the position, the speed, and the like of the target.

Also, display processing and the like for superimposing such CG and texts on the image are performed. If the vehicle 1 is a police vehicle, for example, it is possible to recognize number plates of other vehicles and a face image of a driver, to access a police server or the like via a network for inquiry, and to display names of an owner and a driver of the vehicle on the first display unit 50, the second display unit 51, and the like. Here, at least one of the first display unit 50 and the second display unit 51 displays image data and displays the integrated image recognition result.

In the first embodiment, the integration control unit 41c is configured to share information regarding the recognized object among the plurality of camera units. For example, it is assumed that an object recognized by the camera unit 14 has been recognized as moving in the direction of the angle of view of the camera unit 11. In such a case, the integration control unit 41c transmits the type of the object and prediction information including information regarding the moving direction of the object or priority recognition region information to the recognition unit 31b of the camera unit 11.

The recognition unit 31b of the camera unit 11 performs a recognition operation with reference to the prediction information received from the integration control unit 41c. If the prediction information received from the integration control unit 41c is information regarding the moving direction of the target, for example, which place in the angle of view of the camera unit 11 the object will appear is predicted on the basis of the information.

The integration control unit 41c may transmit the priority recognition region information as the prediction information. The priority recognition region information includes which region in the imaging angle of view of the camera unit 11 the object will appear and when the object will appear, for example. If the priority recognition region information is received as the prediction information, the recognition unit 31b of the camera unit 11 predicts that there is a high likelihood that the object will appear in the priority recognition region at the predicted timing and then performs image recognition.

The integration control unit 41c performs communication with the traveling control unit (ECU) 60 and the like in accordance with a communication protocol based on CAN, FlexRay, Ethernet, or the like. The integration control unit 41c thus performs display processing of appropriately changing information to be displayed on the basis of vehicle control signals from the traveling control unit (ECU) 60 and the like. For example, the integration control unit 41c changes a range of an image to be displayed on the display unit in accordance with a moving state of the vehicle 1 acquired by the vehicle control signals.

Note that the traveling control unit (ECU) 60 is a unit mounted in the vehicle 1 and incorporating a computer and a memory for comprehensively performing driving control, direction control, and the like of the vehicle 1. Information regarding traveling (moving state) of the vehicle 1 such as a traveling speed, a traveling direction, a shift lever, a shift gear, a direction indicator state, and an orientation of the vehicle 1 obtained by a geomagnetic sensor or the like, for example is input as the vehicle control signals from the traveling control unit (ECU) 60 to the integration processing unit 40.

On the contrary, the integration control unit 41c transmits information such as the type, the position, the moving direction, the moving speed, and the like of the predetermined object (obstacle or the like) recognized by the recognition unit 41b to the traveling control unit (ECU) 60. Thus, the traveling control unit (ECU) 60 performs control necessary to avoid the obstacle, such as stopping or driving of the vehicle 1 or a change in traveling direction. Here, the traveling control unit (ECU) 60 functions as a mobile control unit that controls movement of the vehicle 1 on the basis of the integrated image recognition result.

The first display unit 50 is installed near the center of the front upper portion of the driver's seat of the vehicle 1 in the vehicle width direction with the display screen facing the rear side of the vehicle 1 and functions as an electronic rear view mirror, for example. Note that when a half mirror or the like is used and the first display unit 50 is not used as a display, a configuration in which the first display unit 50 can be used as a mirror may be adopted. For example, the first display unit 50 may include a touch panel or an operation button and is configured to be able to acquire an instruction from a user and output the instruction to the integration control unit 41c.

The second display unit 51 is installed in the surroundings of an operation panel near the center of the front side of the driver's seat of the vehicle 1 in the vehicle width direction, for example. Note that a navigation system, an audio system, and the like are mounted in the vehicle 1 that is a mobile object.

Additionally, it is also possible to display various control signals and the like from the navigation system, the audio system, and the traveling control unit (ECU) 60 on the second display unit, for example. For example, the second display unit includes a touch panel or an operation button and is configured to be able to acquire an instruction from the user.

In the first embodiment, the first display unit 50 and the second display unit 51 include liquid crystal displays or organic EL displays as display panels. Note that in the first embodiment, the number of display units is not limited to two. One display unit may be used, or three or more display units may be used.

In the first embodiment, some or all of the components included in the integration processing unit 40 may be realized by hardware or may be realized by the CPU 42 being caused to execute the computer program stored in the memory 43. As the hardware, it is possible to use a dedicated circuit (ASIC), a processor (reconfigurable processor, DSP), or the like.

In the first embodiment, a part or entirety of the image processing performed by the image processing units 3 1a to 34a may be performed by the image processing unit 41a of the integration processing unit 40. In the first embodiment, the image acquisition unit and the first image recognition unit are accommodated in the casing of the same camera unit, for example, and the camera unit and the second image recognition unit are accommodated in different casings.

Although the integration processing unit 40 is mounted in the vehicle 1 that is a mobile object in the first embodiment, a part of processing of the image processing unit 41a, the recognition unit 41b, and the integration control unit 41c in the integration processing unit 40 may be performed by an external server or the like via a network, for example.

In such a case, although the imaging units 21 to 24 that are image acquisition units are mounted in the vehicle 1, for example, some of the functions of the camera processing units 31 to 34 and the integration processing unit 40 can be processed by an external device such as an external server or the like, for example.

A recording unit 61 records the entire image of each of the imaging units 21 to 24 generated by the integration processing unit 40 and the panoramic synthesized image in a recording medium. Moreover, the recording unit 61 records CG of a predetermined frame for indicating the recognized target, texts, alerts, and the like and images displayed on the first display unit 50, the second display unit 51, and the like with CG superimposed thereon along with a clock time, GPS, information and the like.

The integration processing unit 40 can also reproduce past information recorded in the recording unit 61 and display it on the first display unit 50 and the second display unit 51.

A communication unit 62 is for communicating with the external server and the like via a network and can transmit information before being recorded in the recording unit 61 and past information recorded in the recording unit 61 to the external server and the like and save them in the external server and the like.

On the contrary, it is also possible to acquire congestion information and various kinds of information from the external server and the like and to display the information on the first display unit 50 and the second display unit 51 via the integration processing unit 40.

As described above, the image recognition processing is performed on the high-resolution region 10a in the state of the image data before distortion correction. This enables quick recognition, and it is possible to improve recognition accuracy of the image data before distortion correction obtained from the low-resolution region 10b by performing the image recognition processing after the distortion correction.

Furthermore, since the image recognition processing is performed by the recognition unit of the imaging device on the high-resolution region 10a by using hardware in the state of the image data before the distortion correction, it is possible to more quickly perform the image recognition of the high-resolution region 10a in the first embodiment.

Note that a part or entirety of the image recognition processing performed by the recognition units 31b to 34b may be performed by the recognition unit 41b of the integration processing unit 40. However, in such a case, the recognition unit 41b can quickly obtain the image recognition result in a short period of time by performing the image recognition processing on the high-resolution region 10a in the state of the image data before the distortion correction. On the other hand, the image recognition processing is performed on the image data before the distortion correction obtained from the low-resolution region 10b after the distortion correction.

Note that the image processing performed by the recognition units 31b to 34b or the recognition unit 41b may be performed using machine learning. As a recognition method using machine learning, any recognition method may be used as long as the recognition method uses an object detection algorithm.

For example, it is possible to use You Only Look Once (YOLO), Region-based Convolution Neural Networks (R-CNN), Fast R-CNN, Faster R-CNN, Single Shot Multi-Box Detector (SSD), or the like. Note that it is possible to enhance an image recognition rate even if the distorted image is used as it is to some extent, by using machine learning.

Figure 4:
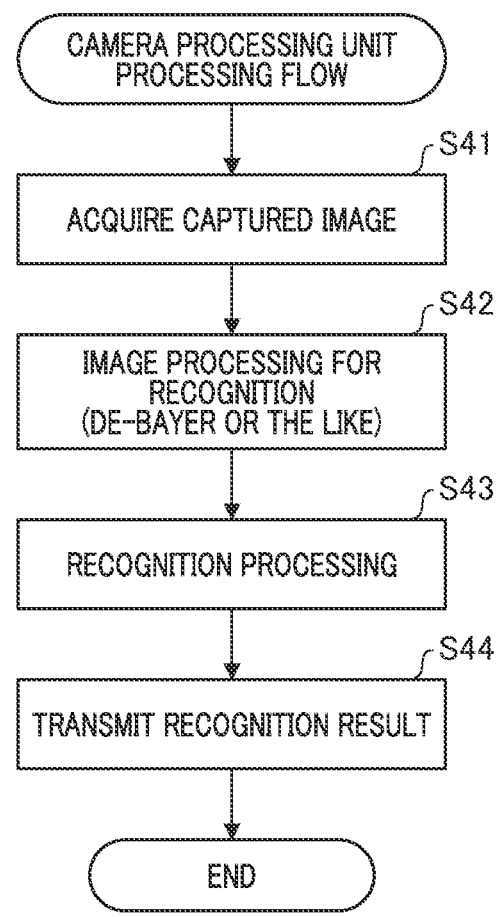
FIG. 4 is a flowchart for explaining a processing flow of camera processing units 31 to 34.

FIG. 4 is a flowchart for explaining a processing flow of the camera processing unit in the first embodiment. The processing flow in FIG. 4 is controlled in units of frames, for example, by the hardware in conjunction with the CPU, the GPU, and the like by the CPUs inside the camera processing units 31 to 34 executing computer programs in the memories.

Once the image processing system 100 is turned on, the hardware is reset, and the flow is started. Thereafter, the flow in FIG. 4 is executed every time an orthogonal synchronous signal is input, and the camera processing units 31 to 34 acquire captured images by using the imaging units 21 to 24, respectively, in Step S41 (an imaging step or an acquisition step).

In Step S42, the image processing units 31a to 34a inside the camera processing units 31 to 34 perform image processing such as De-Bayer processing and white balance adjustment and generate image data before distortion correction.

In Step S43 (first image recognition step), the recognition units 31b to 34b perform image recognition of a predetermined object from at least the high-resolution region 10a on the basis of image data before distortion correction. In Step S43, image recognition is performed on image data in at least a partial region including a low-distortion region out of the image data acquired in Step S41, and a first image recognition result is output.

Note that the recognition units 31b to 34b may perform image recognition on the predetermined object only from the high-resolution region 10a as described above or may perform image recognition on the image in the surrounding low-resolution region 10b as well.

In Step S44, the type and the coordinates (or information of the region of the target) of the object after image recognition are transmitted as a set to the integration processing unit 40.

Figure 5:
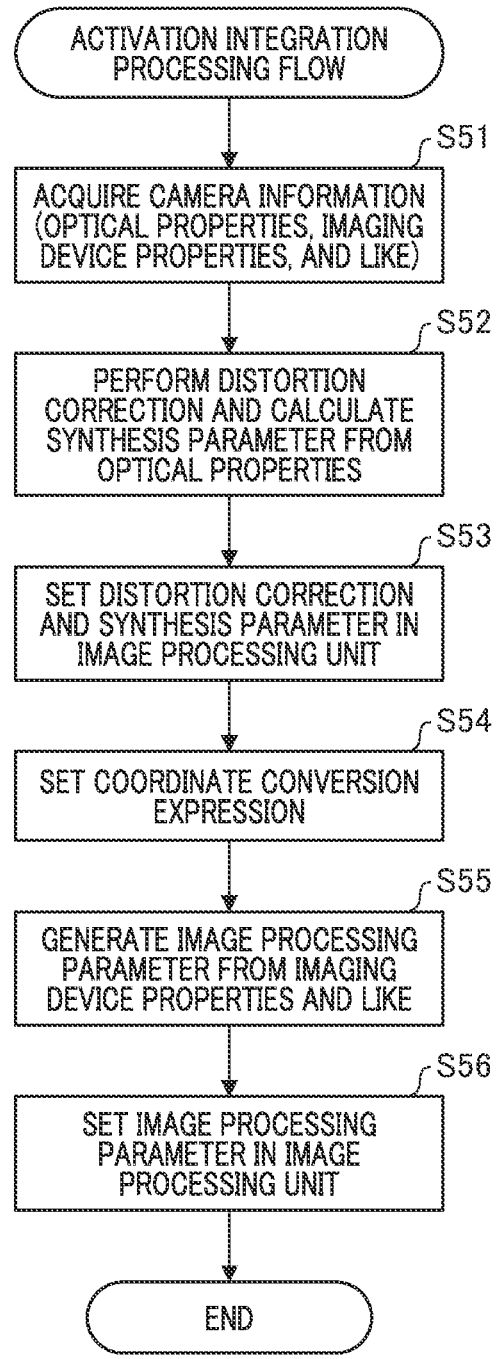
FIG. 5 is a flowchart for explaining a processing flow of an integration processing unit 40.

FIG. 5 is a flowchart for explaining a processing flow performed by the integration processing unit 40 in the first embodiment. The processing flow in FIG. 5 is controlled by the CPU 42 of the integration processing unit 40 executing the computer program in the memory 43.

In Step S51, the integration processing unit 40 acquires camera information of each of the camera information units 31c to 34c of the camera processing units 31 to 34.

In Step S52, a distortion correction parameter is calculated on the basis of optical properties in the camera information, the number of pixels of the imaging devices, and the like. Note that a coordinate conversion table may be prepared in advance instead of calculating the distortion correction parameter, and the distortion correction may be performed using the coordinate conversion table.

Also, interpolation may be performed at the time of the distortion correction. Also, a synthesis parameter for synthesizing images from the plurality of camera units is also calculated on the basis of attachment coordinates and posture information in the vehicle coordinates of each camera unit in the camera information in Step S52.

In Step S53, the distortion correction parameter calculated in Step S52 and the synthesis parameter are set in the image processing unit 41a inside the integration processing unit 40.

In Step S54, a coordinate conversion expression for positioning the coordinates of the low-resolution region after distortion correction and the coordinates of the high-resolution region with no distortion correction performed thereon is calculated. Also, coordinate conversion expressions for positioning coordinates when the images from the plurality of camera units are synthesized are calculated, and these coordinate conversion expressions are set in the integration control unit 41c. In addition, interpolation may be performed in these coordinate conversion expressions.

In Step S55, an image processing parameter is generated on the basis of sensitivity properties, gamma properties, and the like of the imaging devices in the camera information. At that time, the image processing parameter may be generated such that an image recognition rate is improved by statistically processing the image data before the distortion correction.

In Step S56, the image processing parameter generated in Step S55 is set in the image processing unit 41a inside the integration processing unit 40.

Figure 6:
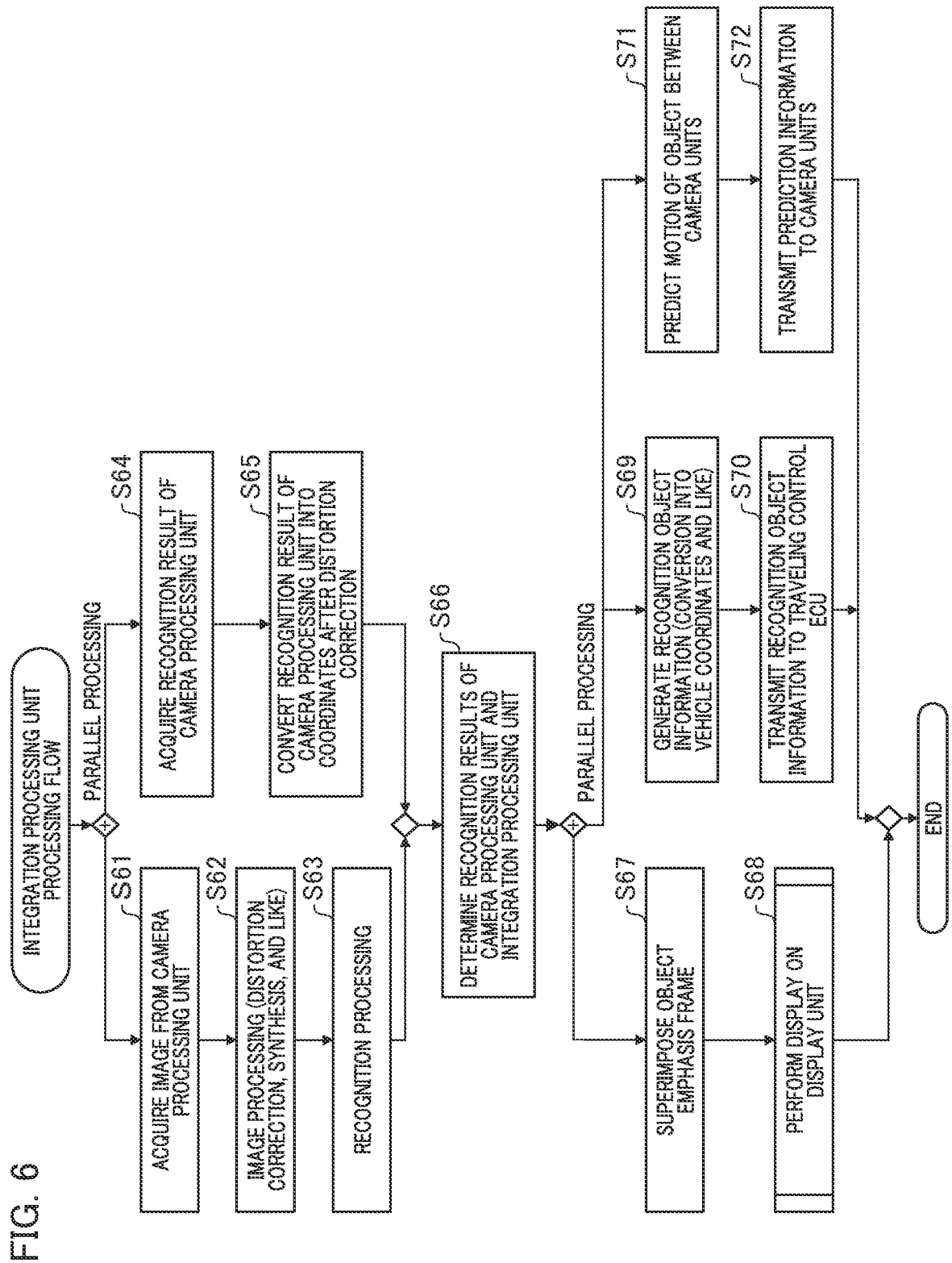
FIG. 6 is a flowchart for explaining an integration processing flow of the integration processing unit 40.

FIG. 6 is a flowchart for explaining an integration processing flow performed by the integration processing unit 40 in the first embodiment. The processing flow in FIG. 6 is controlled in units of frames, for example, by the hardware in conjunction with the CPU, the GPU, and the like by the CPU 42 of the integration processing unit 40 executing the computer program in the memory 43.

In Step S61, the integration processing unit 40 acquires the image data before the distortion correction by using the camera processing units 31 to 34.

In Step S62, the image processing unit 41a of the integration processing unit 40 performs image processing on the image data before the distortion correction, performs distortion correction, and also synthesizes the images from the plurality of camera units. As the distortion correction parameter and the synthesis parameter at that time, the parameters set in Step S53 are used. Note that Step S62 functions as the synthesis step of synthesizing the plurality of pieces of image data captured by the plurality of camera units.

In Step S63 (second image recognition step), the recognition unit 41b of the integration processing unit 40 performs image recognition on image data in the low-resolution region (high-distortion region) after the distortion correction and the other image data. In the second image recognition step, image recognition is performed on image data in a wider region than the partial region on which recognition is performed in Step S43 in the first image recognition step out of image data acquired in Step S41 that is the acquisition step.

Also, image recognition is performed on an object which lies across a plurality of pieces of image data obtained from the plurality of camera units by performing image recognition on the synthesized image obtained by synthesizing the image data from the plurality of camera units as well. Furthermore, image recognition is also performed on the object which moves across the plurality of camera units.

In Step S64, the recognition unit 41b of the integration processing unit 40 acquires a result (the recognized object and the coordinates thereof) of the image recognition performed by the recognition units 31b to 34b of the camera processing units 31 to 34 on each piece of image data before the distortion correction. Note that Steps S64 and S65 are performed in parallel with Steps S61 to S63.

In Step S65, the coordinates of the object recognized by the recognition units 31b to 34b of the camera processing units 31 to 34 are converted into coordinates after the distortion correction.

In Step S66 (integration processing step), the image recognition results of the recognition units 31b to 34b of the camera processing units 31 to 34 and the image recognition result of the recognition unit 41b of the integration processing unit 40 are compared with each other, and a final recognition result is generated.

At this time, the final recognition result is generated on the basis of reliability of each of the image recognition results as described above. If the recognition results of the recognition units 31b to 34b are different from the recognition result of the recognition unit 41b, for example, a recognition result with higher reliability is adopted.

In Step S67, a frame for displaying the object after image recognition in an emphasized manner is generated, and it is superimposed on the image after the distortion correction.

In Step S68, the image is displayed with the frame superimposed thereon on the first display unit 50, the second display unit 51, or the like. At that time, the display region of the image displayed on the first display unit 50, the second display unit 51, or the like and the recognition region of the recognition units 31b to 34b and 41b are changed in accordance with the moving state of the vehicle 1. Details thereof will be described later.

In Step S69, the coordinates of the object after image recognition with respect to the coordinates of the vehicle 1 are generated. Note that Steps S69 and S70 are performed in parallel with Steps S67 and S68.

In Step S70, the coordinates of the object with respect to the vehicle 1 generated in Step S69 and the type of the object are transmitted to the traveling control unit (ECU) 60.

In Step S71, if there is an object moving between camera units, the moving direction and the speed of the object are predicted. For example, the integration control unit 41c recognizes an object that moves across a plurality of pieces of image data and predicts a motion thereof. Note that Steps S71 and S72 are performed in parallel with Steps S69 and S70.

In Step S72, the type of the object and information regarding the moving direction or the like or prediction information regarding a priority recognition region are transmitted to the corresponding camera unit. In this manner, it is possible to improve accuracy of the image recognition on the object on the side of the camera unit. Thereafter, the flowchart in FIG. 6 is ended.

Note that the flowchart in FIG. 6 is executed in units of frames, for example. Also, the parallel processing in FIG. 6 may be realized by hardware processing at least one process of the parallel processing.

Figure 7:
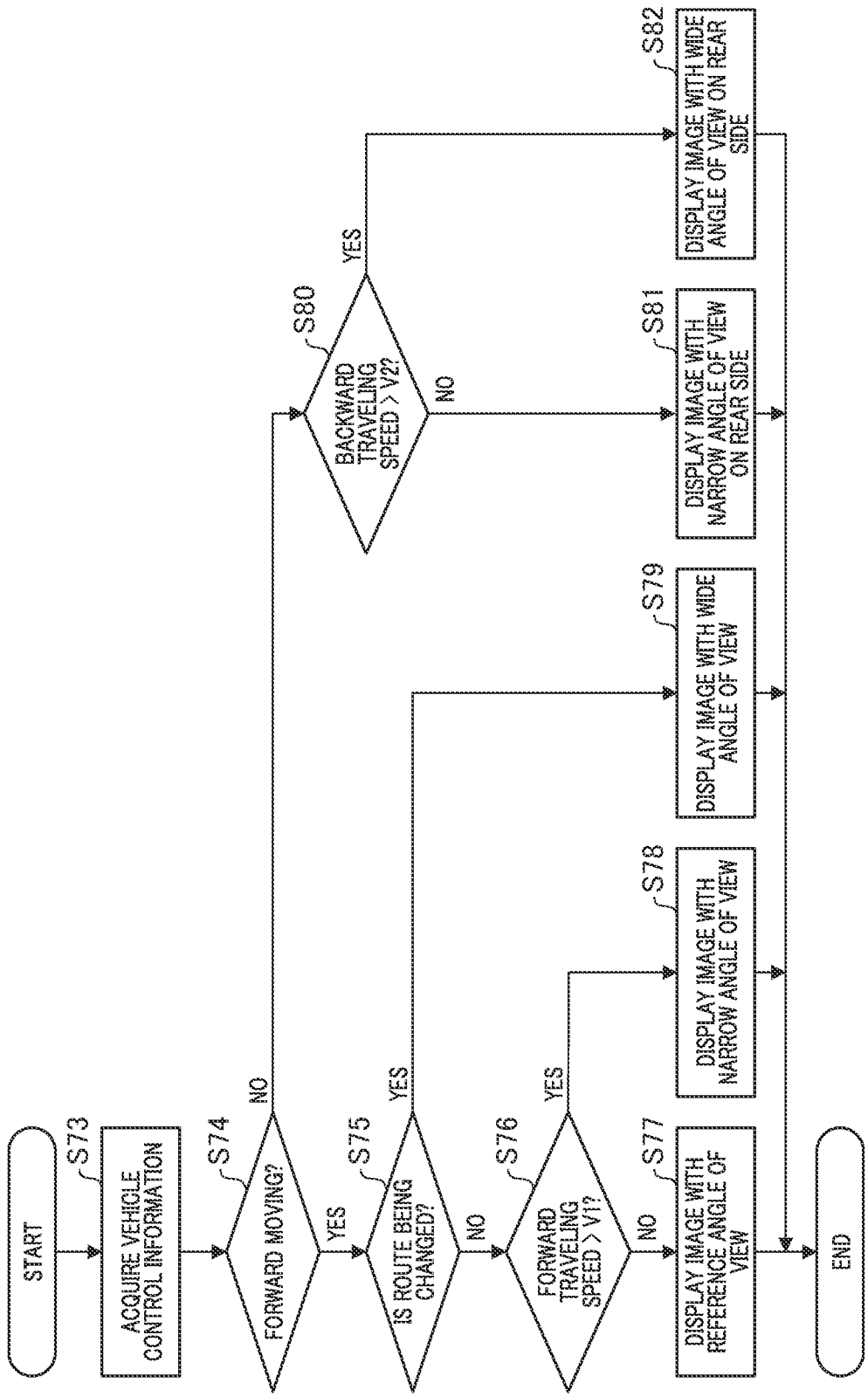
FIG. 7 is a flowchart for explaining an example of an image display method according to the first embodiment.

FIG. 7 is a flowchart for explaining an example of an image display method in the first embodiment. FIG. 7 explains details of Step S68 in FIG. 6, and the processing flow in FIG. 7 is controlled in units of frames, for example, by the CPU 42 of the integration processing unit 40 executing the computer program in the memory 43.

Figure 8A:
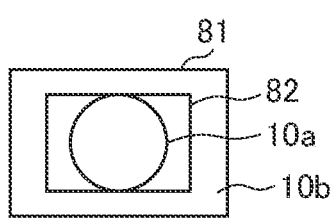
FIGS. 8A to 8E are diagrams for explaining a relationship of a high-resolution region, a low-resolution region, and a plurality of types of display regions according to the first embodiment.
Figure 8B:
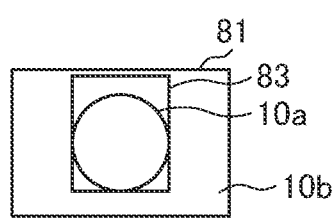

FIGS. 8A to 8E are diagrams for explaining a relationship of a high-resolution region, a low-resolution region, and a plurality of types of display regions in the first embodiment. FIG. 8A is a diagram for explaining an example of a display region 82 with a reference angle of view of the camera units 11, 12, and 14, and FIG. 8B is a diagram for explaining an example of a display region 83 with a narrow angle of view of the camera units 11, 12, and 14.

Figure 8C:
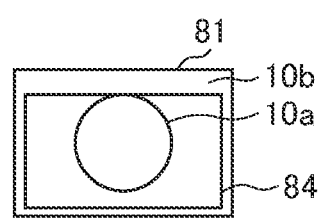
Figure 8D:
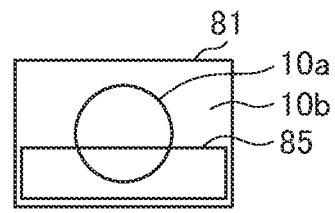
Figure 8E:
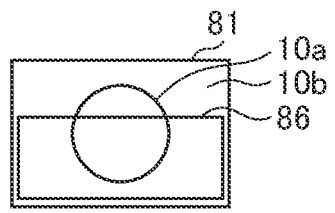

FIG. 8C is a diagram for explaining an example of a display region 84 with a wide angle of view of the camera units 11, 12, and 14, and FIG. 8D is a diagram for explaining an example of a display region 85 with a narrow angle of view behind the camera unit 13. Also, FIG. 8E is a diagram for explaining an example of a display region 86 with a wide angle of view behind the camera unit 13.

Figure 2:
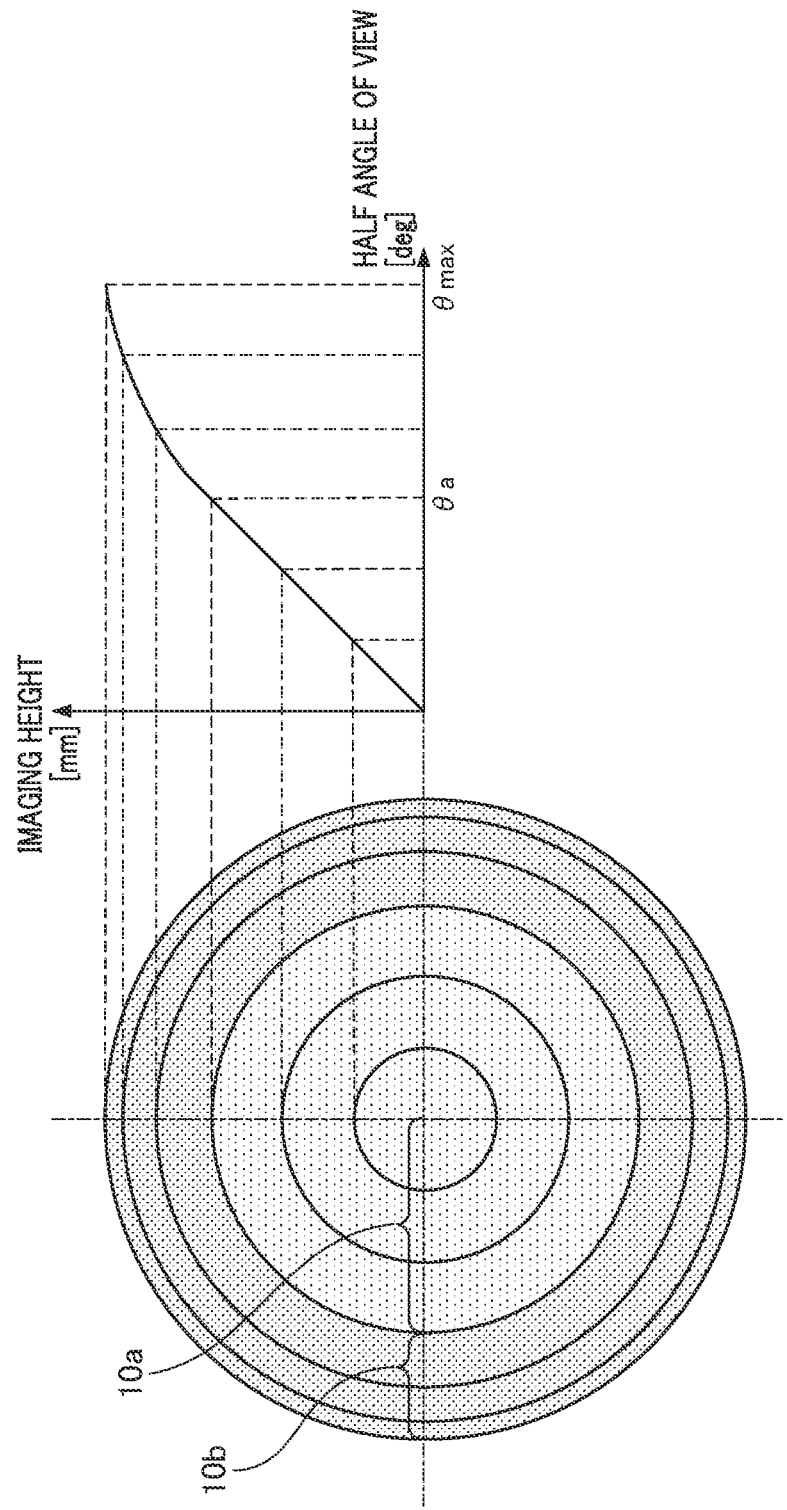
FIG. 2A and FIG. 2B are diagrams for explaining optical properties of the camera units 11 to 14.
Figure 10A:
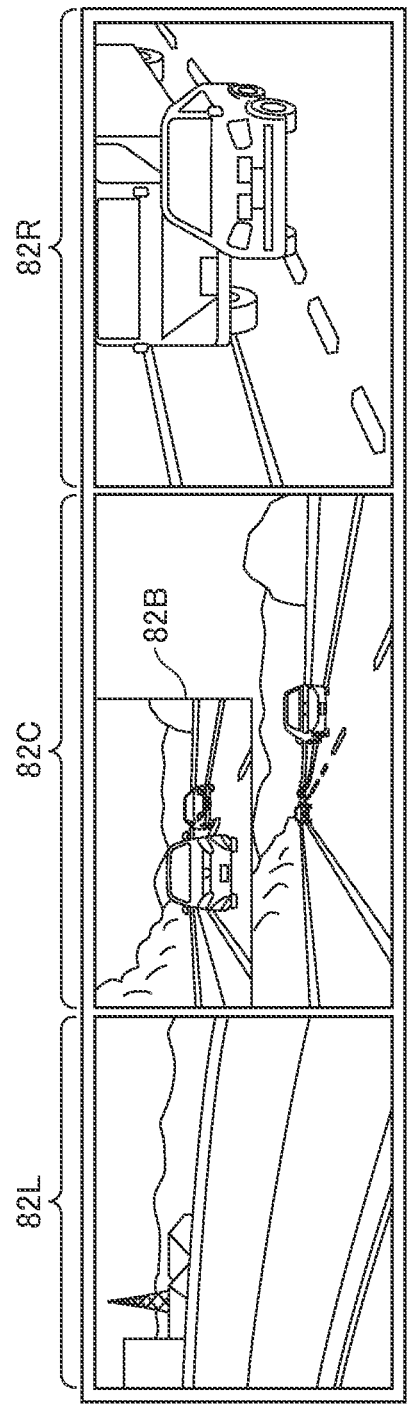
FIG. 10A is a diagram for explaining a display example of a display screen 501 of a first display unit 50.
Figure 10B:
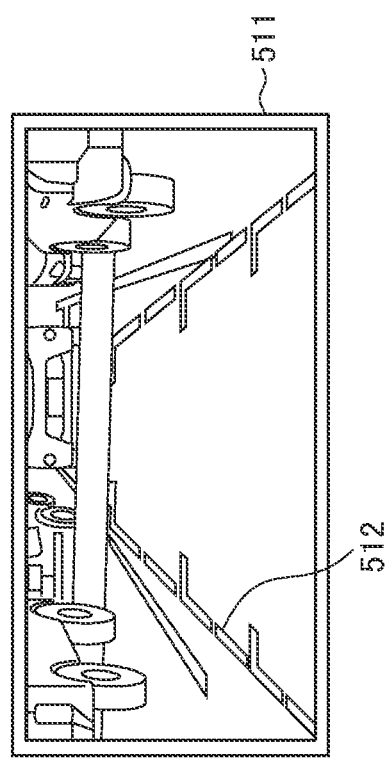
FIG. 10B is a diagram for explaining a display example of a display screen 511 of a second display unit 51.

In FIGS. 8A to 8E, 81 denotes the light receiving surface of the imaging device, 10a denotes the high-resolution region (low-distortion region) described in FIGS. 2, and 10b denotes the low-resolution region (high-distortion region). However, the boundary between the above high-resolution region (low-distortion region) 10a and the low-resolution region (high-distortion region) 10b is not displayed in the image that is ordinarily displayed.

However, the aforementioned boundary may be displayed in a superimposed manner on the image as needed. In the first embodiment, the region recognized by the recognition unit 41b is the entire display region, for example. Also, the region recognized by the recognition units 31b to 34b has, for example, rectangular shapes that are inscribed in the high-resolution region 10a in the display region. As illustrated in FIGS. 8A to 8E, the plurality of types of display regions can be switched, and these display regions are switched on the basis of vehicle control information from the traveling control unit (ECU) 60.

In Step S73 in FIG. 7, the CPU 42 acquires the vehicle control information from the traveling control unit (ECU) 60. The vehicle control information includes, for example information regarding traveling of the vehicle 1 such as a traveling speed, a traveling direction, a shift lever, a shift gear, and a direction indicator, for example, as described above.

In Step S74, the CPU 42 determines whether or not the vehicle 1 is in a forward traveling state on the basis of the vehicle control information. If it is determined that the vehicle 1 is in the forward traveling state (Yes in Step S74), the CPU 42 moves on to Step S75. If it is determined that the vehicle 1 is not in the forward traveling state (No in Step S74), the CPU 42 moves on to Step S80.

In Step S75, the CPU 42 determines whether or not a route is being changed. If it is determined that the route is being changed (Yes in Step S75), the CPU 42 moves on to Step S76. If it is determined that the route is not being changed (No in Step S75), the CPU 42 moves on to Step S79.

In Step S76, the CPU 42 determines whether or not the forward traveling speed is greater than a predetermined threshold value V1. If it is determined that the forward traveling speed is greater than the predetermined threshold value V1 (Yes in Step S76), the CPU 42 moves on to Step S78. If it is determined that the forward traveling speed is not greater than the predetermined threshold value V1 (No in Step S76), the CPU 42 moves on to Step S77.

In Step S77, the CPU 42 causes the first display unit 50 to display an image with a reference angle of view. For example, the CPU 42 causes the first display unit 50 to display the image in the display region 82 with the reference angle of view in FIG. 8A.

Figure 9A:
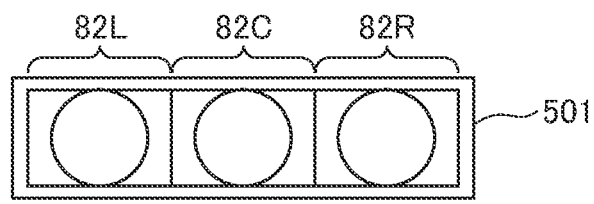
FIG. 9A is a diagram for explaining a display example of an image with a reference angle of view.
Figure 9B:
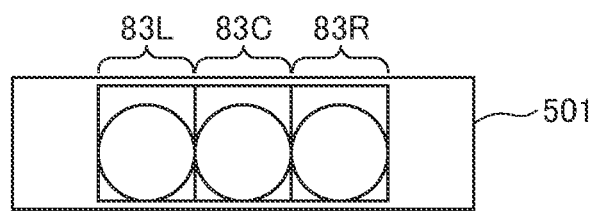
FIG. 9B is a diagram for explaining a display example of an image with a narrow angle of view.
Figure 9C:
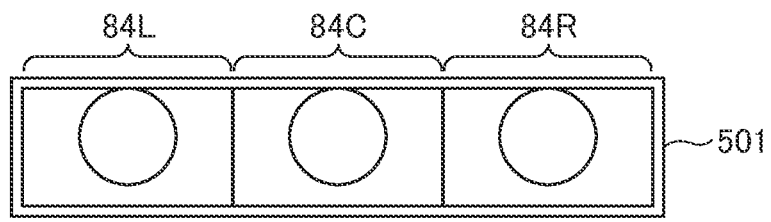
FIG. 9C is a diagram for explaining a display example of an image with a wide angle of view.

FIG. 9A, FIG. 9B, and FIG. 9C are diagrams for explaining display examples of the first display unit 50. FIG. 9A is a diagram for explaining a display example of an image with a reference angle of view, FIG. 9B is a diagram for explaining a display example of an image with a narrow angle of view, and FIG. 9C is a diagram for explaining a display example of an image with a wide angle of view.

In FIG. 9A, 501 denotes a display screen of the first display unit 50. 82R denotes an image with a reference angle of view of the camera unit 14 on the left side, 82C denotes an image with a reference angle of view of the camera unit 11 at the front, and 82R denotes an image with a reference angle of view of the camera unit 12 on the right side.

If the image in the display region 82 with the reference angle of view in FIG. 8A is displayed on the first display unit 50, for example, the image is displayed as in FIG. 9A, for example. For example, an image 82L with a reference angle of view of the camera unit 14 on the left side, an image 82C with a reference angle of view of the camera unit 11 at the front, and an image 82R with a reference angle of view of the camera unit 12 on the right side are aligned in this order from the left side and are displayed on the display screen 501 of the first display unit 50.

FIG. 10A is a diagram for explaining a display example of the display screen 501 of the first display unit 50 in the first embodiment. FIG. 10B is a diagram for explaining a display example of the display screen 511 of the second display unit 51 in the first embodiment.

As illustrated in FIG. 10A, if it is determined that the forward traveling speed is not greater than the predetermined threshold value V1 in Step S76, then the images 82L, 82C, and 82R with the reference angle of view are aligned and displayed on the display screen 501 of the first display unit 50.

Note that in FIG. 10A, 82B is an image with a reference angle of view of the camera unit 13 for the rear side and is displayed as a picture in a picture on the display screen 501 of the first display unit 50. In the first embodiment, if it is determined that the forward traveling speed is not greater than the predetermined threshold value V1 in Step S76, the image 82B with the reference angle of view of the camera unit 13 is displayed on the first display unit 50.

In Step S78, the CPU 42 causes the first display unit 50 to display the image in the display region 83 with the narrow angle of view illustrated in FIG. 8B. The display region 83 is wider on the upper side and has a narrower width in the left-right direction as compared with the display region 82. Also, an image 83L with a narrow angle of view of the camera unit 14 on the left side, an image 83C with a narrow angle of view of the camera unit 11 at the front, and an image 83R with a narrow angle of view of the camera unit 12 on the right side are displayed in an aligned manner as in FIG. 9B.

Since the view becomes narrow if the forward traveling speed is greater than the predetermined threshold value V1 (60 km, for example) in this manner, necessary information can be easily and quickly viewed if the display as in FIG. 9B is performed.

In Step S79, the CPU 42 causes the first display unit 50 to display the image in the display region 84 with the wide angle of view illustrated in FIG. 8C. The display region 84 has a wider width in the left-right direction and is widened in the lower direction as compared with the display region 82. As illustrated in FIG. 9C, for example, an image 84L with a wide angle of view of the camera unit 14 on the left side, an image 84C with a wide angle of view of the camera unit 11 at the front, and an image 84R with a wide angle of view of the camera unit 12 on the right side are aligned and displayed on the display screen 501 of the first display unit 50.

Furthermore, if the route is being changed to the left side, for example, the three images displayed in an aligned manner in FIG. 9C may be displayed with leftward deviation with respect to the center of the display screen 501. On the contrary, if the route is being changed to the right side, the three images displayed in an aligned manner in FIG. 9C may be displayed with rightward deviation with respect to the center of the display screen 501.

Such display can enhance visibility. Since the images with the wide angles of view are displayed when the route is being changed, it is possible to more easily view safety of the surroundings. Furthermore, since the image with an angle of view widened on the lower side is displayed, it is possible to more easily view an obstacle on a road.

In Step S80, the CPU 42 determines whether or not the backward traveling speed is greater than a predetermined speed V2 (10 km, for example). If it is determined that the backward traveling speed is greater than the predetermined speed V2 (Yes in Step S80), the CPU 42 moves on to Step S82. If it is determined that the backward traveling speed is not greater than the predetermined speed V2 (No in Step S80), the CPU 42 moves on to Step S81.

In Step S81, the CPU 42 causes the display screen 511 of the second display unit 51 to display an image (the image as illustrated in FIG. 8D) in the display region 85 with a narrow angle of view in the up-down direction for backward traveling as in FIG. 10B. FIG. 10B illustrates an example of a screen displayed on the display screen 511 of the second display unit 51 when the vehicle 1 moves backward, and a guide 512 for guiding the vehicle 1 to a parking space is displayed in a superimposed manner, for example.

Figure 11A:
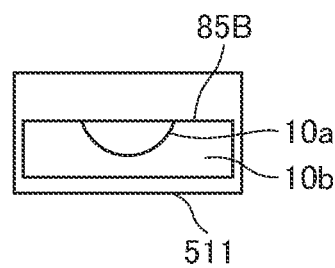
FIG. 11A is a diagram for explaining an example of an image 85B with a narrow angle of view at the time of backward moving.

FIG. 11A is a diagram for explaining an example of the image 85B with a narrow angle of view in the up-down direction at the time of backward moving, and the image 85B with the narrow angle of view in the up-down direction as in FIG. 11A is displayed on the display screen 511 of the second display unit 51.

Figure 11B:
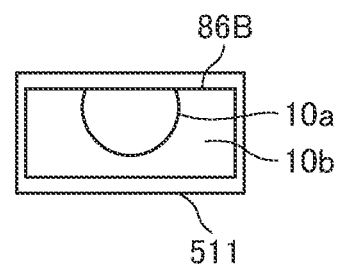
FIG. 11B is a diagram illustrating an example of an image 86B with a wide angle of view for backward traveling.

In Step S82, the CPU 42 causes the display screen 511 of the second display unit 51 to display the image 86B with a wide angle of view in the up-down direction for backward traveling (such as an image illustrated in FIG. 8E) as in FIG. 11B. Here, FIG. 11B is a diagram illustrating an example of the image 86B with a wide angle of view for backward traveling in the first embodiment.

As illustrated in FIG. 8E, the display region 86 with a wide angle of view for backward traveling has an angle of view widened in the up-down direction as compared with the display region 85 with a narrow angle of view for backward traveling. This is for easy viewing of an obstacle through further backward display if the backward traveling speed is greater than the predetermined speed V2.

Note that although the left-right width of the display region 86 with a wide angle of view for backward traveling is the same as the left-right width of the display region 85 with a narrow angle of view for backward traveling in the first embodiment, the left-right width of the display region 86 may be narrower than the left-right width of the display region 85.

In this manner, the high-resolution region (low-distortion region) 10a is configured to have projection properties approximated to the center projection method ($y=f\times\tan\theta$) or the equidistant projection method ($y=f\times\theta$) of the optical system for normal imaging as described above in the first embodiment.

Therefore, an image for an electronic rear view mirror, for example, displayed on the first display unit 50 has a higher resolution as compared with the low-resolution region (high-distortion region) 10b and can display further locations on the front side, the lateral sides, and the rear side of the vehicle 1 with higher definition.

Also, since the high-resolution region 10a includes small optical distortion, it is also possible to display the image for the electronic rear view mirror displayed on the first display unit 50 in a state with small distortion, and the driver can view the surroundings of the vehicle 1 with more natural perspective.

Moreover, since the image recognition is performed on the high-resolution region 10a in the state of the image data before distortion correction, it is possible to set an image recognition timing earlier when image recognition is performed for a number plate of a surrounding vehicle, a person, an obstacle and the like and to enhance image recognition accuracy.

Since the high-resolution region 10a in the first embodiment is configured to include small optical distortion, and it is possible to perform image recognition in the state of image data before distortion correction, it is possible to reduce a processing load for the image recognition and to perform the image recognition at a high speed. It is thus possible to discover an obstacle in an early stage on the basis of the image recognition result and to timely perform an operation for avoiding the obstacle.

If the configuration in the first embodiment is used in this manner, it is possible to obtain great effects at the time of high-speed traveling along a highway, for example. Note that although the example in which the plurality of camera units are used has been described in the first embodiment, the configuration is also effective in a system including only one camera unit.

As described above, high-definition display for an electronic rear view mirror and wide-range display for checking the surroundings, such as a rear side, of a vehicle are acquired at the same time with a small number of cameras, and an extracted region of an image to be output is changed in accordance with a vehicle control state, in the first embodiment. Also, the display angle of view is changed on the basis of traveling speed information (including the moving state of the vehicle 1) of the vehicle 1. It is thus possible for the driver to easily check a more important range in accordance with the vehicle control state.

Moreover, the image recognition region is changed by changing the extracted region in accordance with the moving state of the vehicle 1. For example, the display region of the image to be displayed on the display unit and the recognition region of the first image recognition unit and the second image recognition unit are changed by changing the extracted region in accordance with the moving state of the vehicle 1, and it is thus possible to perform efficient image recognition with less waste. Note that the display region and the recognition region may not be the same.

Note that not only the extracted region may be changed but also the resolution may be changed in the first embodiment. For example, the display angle of view may be narrowed, and the resolution of the surrounding angle of view may be lowered at the time of high-speed traveling.

Although the case in which speed information is used as the vehicle control state has been described as an example in the first embodiment, obstacle information in the surroundings of the vehicle may be acquired from the imaging units 21 to 24 or other sensors, for example, and the display region may be changed on the basis of the obstacle information.

Note that the example in which the image processing system is mounted in a mobile object such as the vehicle 1 has been described in the first embodiment. However, the mobile object in the first embodiment is not limited to a vehicle such as an automobile and may be any mobile object such as a train, a ship, an aircraft, a robot, or a drone as long as the mobile object moves.

Also, the image processing system in the first embodiment includes any image processing system mounted in such a mobile object. Additionally, it is also possible to apply the first embodiment to a case in which the mobile object is remotely controlled.

Note that the example in which the imaging units 21 to 24 are used as image acquisition units has been described in the first embodiment. However, the image acquisition unit may be any image acquisition unit as long as it acquires image data generated by imaging devices that capture optical images including a low-distortion region and a high-distortion region and may be an image acquisition unit that acquires image data as described above via a network, for example. Alternatively, the image acquisition unit may acquire the image data as described above recorded in the recording medium by reproducing it.

Second Embodiment

At least one of various functions, processing, and methods described above in the first embodiment can be realized using a program. Hereinafter, the program for realizing the at least one of the various functions, processing, and the methods described above in the first embodiment will be referred to as a "program X" in a second embodiment.

Moreover, a computer for executing the program X will be referred to as a "computer Y" in the second embodiment. A personal computer, a microcomputer, a central processing unit (CPU), or the like is an example of the computer Y. The computer such as the image processing system in the aforementioned embodiment is also an example of the computer Y.

At least one of the various functions, processing, and the methods described above in the first embodiment can be realized by the computer Y executing the program X. In this case, the program X is supplied to the computer Y via a computer-readable storage medium.

The computer-readable storage medium in the second embodiment includes at least one of a hard disk device, a magnetic storage device, an optical storage device, a photomagnetic storage device, a memory card, a ROM, a RAM, and the like. Moreover, the computer-readable storage medium in the second embodiment is a non-transitory storage medium.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

This application claims the benefit of Japanese Patent Application No. 2021-155814 filed on Sep. 24, 2021, which is hereby incorporated by reference herein in its entirety.

What is claimed is:

1. An image processing system comprising:
  at least one processor or circuit configured to function as
    a plurality of units comprising:
    (1) an image acquisition unit configured to acquire image data generated by an imaging device that captures an optical image including a low-distortion region and a high-distortion region;
    (2) a first image recognition unit configured to perform image recognition on image data of at least a partial region in the image data acquired by the image acquisition unit to output a first image recognition result;
(3) a second image recognition unit configured to perform image recognition on image data of a region wider than the partial region in the image data acquired by the image acquisition unit to output a second image recognition result; and
(4) an integration processing unit configured to output an image recognition result integrated on the basis of the first image recognition result and the second image recognition result,
wherein the image acquisition unit includes (a) an optical system that forms the optical image, and (b) an imaging device that captures the optical image generated by the optical system, and
wherein when a focal distance of the optical system is defined as f, a half angle of view is defined as θ, an image height on an image plane is defined as y, and a projection property representing a relationship between the image height y and the half angle of view θ is defined as y(θ), y(θ) in the low-distortion region is greater than f×θ and is different from the projection property in the high-distortion region.

2. The image processing system according to claim 1, wherein the low-distortion region is configured to have a projection property that is approximated to a center projection method (y=f×tanθ) or an equidistant projection method (y=f×θ).

3. The image processing system according to claim 1, wherein when θmax is defined as a maximum half angle of view that the optical system has and A is defined as a predetermined constant, the image processing system is configured to satisfy $$1 < \frac{f \times \sin\theta_{max}}{y(\theta_{max})} \leq A.$$

* * * * *